Jan. 1, 1963  G. KLEIN  3,071,011
SPACE-REFERENCE GYRO OF THE RESTRAINED TYPE
Filed Feb. 3, 1960  2 Sheets-Sheet 2

United States Patent Office 3,071,011
Patented Jan. 1, 1963

3,071,011
SPACE-REFERENCE GYRO OF THE
RESTRAINED TYPE
Gerald Klein, Nurnberg, Germany, assignor to Siemens-Schuckertwerke Aktiengesellschaft, Berlin-Siemensstadt, Germany, a corporation of Germany
Filed Feb. 3, 1960, Ser. No. 6,523
Claims priority, application Germany Feb. 4, 1959
9 Claims. (Cl. 74—5.7)

My invention relates to gyros for sensing spacial changes, particularly for performing a controlling or signalling operation, on aircraft and for various other purposes. So-called free gyros are used for sensing absolute orientations in space, whereas damped or restrained gyros serve for response to rates of positional change.

The performance of such gyros satisfies the equation $$M_z = J_x \cdot \omega_x \cdot \omega_y$$

This equation indicates that a gyro wheel having the polar inertia moment $J_x$ when rotating about its wheel axis at an angular velocity $\omega_x$ and when subjected to an external angular velocity $\omega_y$ about an axis perpendicular to the wheel axis—hereinafter called measuring axis—produces a turning moment $M_z$ about a third axis at a right angle to each of the two other axes. The measuring axis, as a rule, is not embodied by shaft structure but is defined only by the respective positions of the other two axes.

Restrained gyros for measuring angular velocity are therefore so designed that their wheel housing is rotatable about an axis (hereinafter called transverse axis) perpendicular to the gyro wheel axis. The elastic restraint acts upon the transverse axis and is usually applied by springs which elastically brace the wheel housing and tend to maintain it in a middle or zero position. This restraint has the effect of correlating a corresponding angular deflection to the turning moment about the transverse axis occurring when an external angular velocity is effective upon the gyro.

If such restrained gyros (rate gyros) are to be used, for example as signal transmitter or sensing member, in a flight-directional pilot system, the natural frequency of the measuring apparatus must be considerably higher than the frequencies of expectable disturbances, so as to avoid the excessive phase lag otherwise resulting from the response to angular velocities due to such disturbances and apt to impair the stability of flight control. With increasing travelling speeds of aircraft, the disturbing frequencies caused by gusts increase accordingly, so that the restrained gyroscopic devices must be designed for correspondingly higher natural frequencies.

However the natural frequency of a rate gyro depends upon the (square-root values of the) specific restraint and upon the inertia moment of all masses rotatable about the transverse axis. It is necessary therefore to minimize this inertia moment. In the known gyro devices, the inertia moment is determined by the equatorial inertia moment of the rotating gyro mass, the gyro housing with the running bearings, and the gyro stator required for the electrical gyro drive.

For improving the above-described gyro devices, it has been proposed to separate the drive motor from the gyro proper and to couple both through a leaf spring. In the known device the leaf spring is straddled by two parallel pins in the gyro wheel so as to be stressed only by torsion. The leaf spring has approximately the action of a universal joint and, like such a joint, does not impose discernible return forces upon the gyro. Consequently, a spring restraint must be additionally provided.

The known spring-restraint devices in gyros have the disadvantage that the clamping or tensioning of the spring members, or the spring members themselves, always cause zero-point errors, which cannot be sufficiently eliminated by the known means.

It is an object of my invention to devise a damped gyro for sensing spacial changes, particularly on aircraft, in which the drive motor is separated from the gyro proper and in which the zero errors resulting from the elastic restraint are obviated.

To this end, and in accordance with my invention, the drive motor is coupled with the gyro member proper by a spring-elastic transmission shaft which also effects the necessary elastic restraint of the gyro. The elastic drive shaft in a rate gyro according to the invention, therefore, is not only stressed by torsion caused by air resistance and bearing friction of the gyro, but is also subjected to elastic bending. By thus assigning the spring moment and elastic restraint of the gyro exclusively to the drive shaft, any zero errors are completely compensated by the rotating shaft not only at the natural frequency of the oscillating system but also at the much higher rotating speed of the gyro.

According to another feature of the invention, it is particularly advantageous to give the shaft of the gyro wheel and/or the shaft of the drive motor a hollow, tubular design and to have the drive shaft pass through the tubular shaft of the gyro wheel or also through the shaft of the motor. The drive shaft is preferably coupled with the gyro wheel at the wheel side remote from the motor and, as the case may be, is also coupled with the motor on the side remote from the gyro wheel. This results in a relatively long and correspondingly elastic drive shaft in a compact overall design. Due to the close mounting of the components and the use of hollow shafts for the gyro wheel and/or motor, the turning deflection of the restrained gyro wheel is correspondingly limited but remains sufficient for accurately sensing all occurring positional changes since in practice only a few angular degrees of deflection are needed.

The coupling between drive shaft and gyro wheel, as well as between drive shaft and motor, can be effected with the aid of intermeshing longitudinal teeth which permit the drive shaft and the part coupled therewith to freely move relative to each other in the axial direction. This compensates the slightly longitudinal displacements occurring during deflection of the gyro wheel. Any other type of coupling securing an axial degree of freedom is applicable for the same purpose. In order to also eliminate the slight friction that may occur during deflection of the gyro wheel, the coupling may comprise a rotationally rigid but axially deflectable diaphragm.

The invention will be further explained with reference to the embodiments of gyros according to the invention illustrated by way of example on the accompanying drawing in which.

Figure 1:
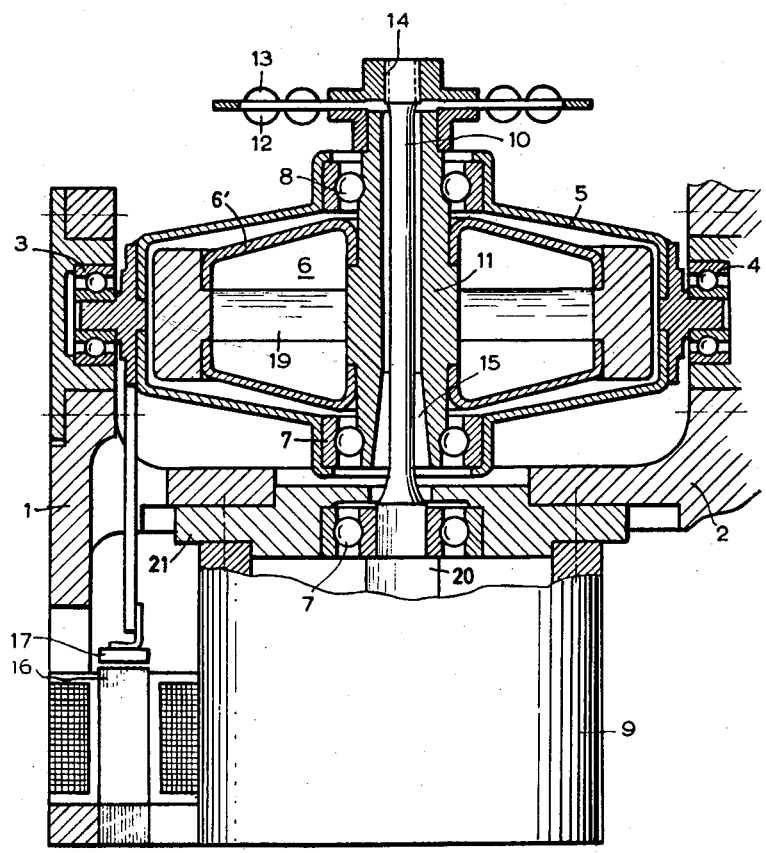
FIG. 1 is an axially sectional view of the complete device.

A frame structure comprising rigid wall portions 1 and 2 which, when the device is installed on aircraft, have a fixed position relative to the craft, carry two coaxially aligned gimbal bearings 3 and 4 in which the housing 5 of the gyro wheel 6 is journalled. The wheel 6 is journalled in housing 5 by two coaxially aligned bearings 7 and 8 whose common journalling axis extends at a right angle to that of the bearings 3, 4. The gyro wheel 6 is driven by an electric motor 9 whose mounting plate 21 is firmly secured to the wall portions 1 and 2 of the frame. The shaft 20 of the drive motor 9 is connected by a transmission shaft 10 with the tubular shaft 11 of the wheel 6 by means of a rotationally rigid coupling which comprises two diaphragm members 12, 13 rigidly joined at their periphery, the lower diaphragm member 12 being firmly mounted on tubular shaft 11 whereas the upper diaphragm member 13 is rigidly joined with shaft 10. The two diaphragms 12 and 13 may axially deflect from each other and thus permit relative axial motion between transmission shaft 10 and wheel shaft 11 during deflecting motion of the gyro wheel about the axis of bearings 3, 4.

Figure 2:
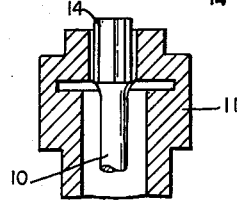
FIG. 2 is an axial section and FIG. 2a is a top view of a modified portion of the device.
Figure 2A:
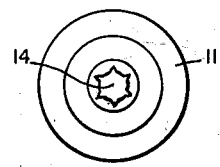

The coupling between transmission shaft 10 and wheel shaft 11 may also be effected by means of longitudinal teeth as shown at 14 in FIG. 2. The teeth on shaft 10 can longitudinally slide in the teeth joined with the hollow shaft 11 while constituting a rigid coupling with respect to torque transmission.

The shaft 10 is substantially rigid with respect to torque transmission but consists of an elastic material such as steel and is given such a cross section relative to its length as to be capable of bending elastic deformation. Normally the transmission shaft 10 acts as a spring-restraint tending to hold the gyro wheel in its normal position. When the gyro is subjected to external angular velocities causing a turning moment about the transversal axis, the shaft 10 will yield laterally.

To provide for greater freedom of deflective motion of the wheel housing, the bore of hollow shaft 11 may be conically widened in the direction toward the motor 9 or, as illustrated in FIG. 1, may be provided with a conical enlargement 15 only at the shaft end close to the motor. The deflections of the gyro housing 5 about the transversal axis of the bearings 3 and 4, occurring when the device is subjected to angular velocity in the plane of illustration while the gyro wheel is rotating at proper speed, can be measured for example by means of an inductive frictionless sensing member consisting in known manner of a three-finger iron 16 provided with primary and secondary alternating-current windings, and an iron armature 17 of smallest feasible weight which is mechanically connected with the housing 5 and hence changes the reluctance of the magnetic system and thus the secondary output voltage in dependence upon the deflections of the housing. The same device 16, 17 may also be used as energy dissipating means for damping the housing deflection about said transversal axis of the bearings 3 and 4. In the latter case this is done by merely short circuiting the winding on core 16 so that movement of member 17 produces short circuit currents.

It is preferable to give the gyro housing 5 and the connection of the gyro wheel with the motor shaft such a design that a maximum of mechanical strength is obtained with smallest feasible mass. To this end the housing 5 as well as the connection 6' between the fly-wheel mass of the gyro and the shaft 11 are given a conical shape as illustrated.

Figure 3:
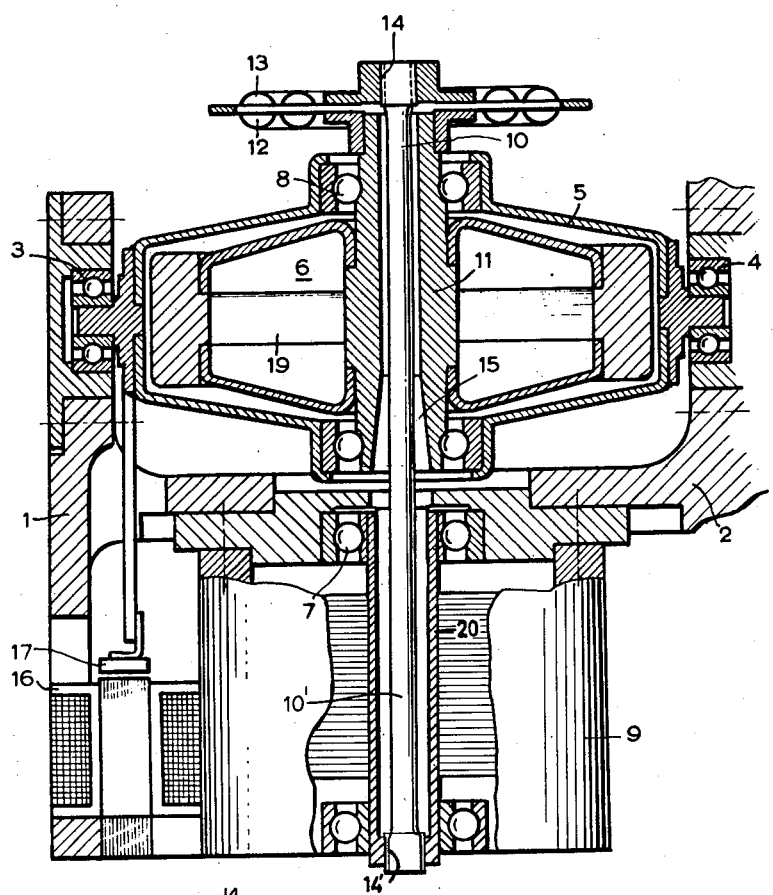
FIG. 3 is an axially sectional view of another modified portion of the device.

As mentioned above, the shaft 20 of the drive motor may also be made hollow in order to obtain a greater elastic length of the transmission shaft 10. This is illustrated in FIG. 3 according to which the motor shaft 20 is tubular and is traversed with sufficient clearance by a portion 10' of the correspondingly extended elastic shaft 10. The coupling between the elastic shaft 10 and the tubular motor shaft 20 is effected by longitudinally extending teeth 14'. It will be understood that the modification of FIG. 3 is applicable in a device otherwise designed and operating as described above with reference to FIG. 1 or FIG. 2.

It will be obvious to those skilled in the art upon study of this disclosure, that with respect to design details my invention permits of various modifications and may be given embodiments other than particularly illustrated and described herein, without departing from the essential features of my invention and within the scope of the the claims annexed hereto.

I claim:

1. A rate gyro for sensing spacial changes, particularly on aircraft, comprising a carrier, a housing pivotally journalled on said carrier for rotation about a pivot axis, a gyro wheel rotatably journalled in said housing about an axis of rotation extending substantially perpendicularly to said pivot axis, a drive motor mounted separate from the gyro wheel, and transmission means rotatable about a predetermined axis and drivingly connecting said motor with said wheel, said transmission means comprising an elastic member deformable in a direction perpendicular to said predetermined axis of said transmission means, the elastic deformation of said member effecting elastic restraint of said gyro wheel.

2. A rate gyro for sensing spacial changes, particularly on aircraft, comprising a carrier, a housing pivotally journalled on said carrier for rotation about a pivot axis, a gyro wheel rotatably journalled in said housing about an axis of rotation extending substantially perpendicularly to said pivot axis, a drive motor separate from the gyro wheel and mounted in coaxial relation to the normal position of the wheel axis, and transmission means for transmitting the motion from said motor to said gyro wheel, said transmission means comprising a torsionally stiff drive shaft coaxially joining said motor with said wheel for transmitting rotation to said wheel, said shaft being elastically yieldable transversely and forming thereby an elastic restraint of said gyro wheel.

3. A rate gyro comprising a carrier, a housing pivotally journalled on said carrier for rotation about a pivot axis, a gyro wheel having a tubular wheel shaft for rotatably mounting said wheel in said housing, said wheel shaft forming a wheel axis extending substantially perpendicularly to said pivot axis, said housing being disposed so that said pivot axis thereof passes approximately through the gravity center of said wheel, a drive motor separate from said wheel and mounted in coaxially spaced relation to the normal position of said wheel axis, a torsionally stiff drive shaft coaxially joining said motor with said wheel for transmitting rotation to said wheel, said drive shaft extending from said motor through said tubular wheel shaft and being drivingly coupled with said tubular shaft on the wheel side remote from said motor, said drive shaft having lateral clearance in said tubular shaft and having a portion elastically flexible in the lateral direction thereof so as to form an elastic restraint for the gyro.

4. In a rate gyro according to claim 3, said tubular wheel shaft being hollow, said motor also having a hollow shaft, said flexible drive shaft extending with clearance through said motor shaft and being coupled therewith at the motor side remote from said gyro wheel for prolonging the elastically flexible portion of said shaft.

5. A rate gyro comprising a gyro wheel having a gimbal-mounted tubular wheel shaft, a drive motor separate from said wheel and mounted in coaxially spaced relation thereto, a torsionally stiff drive shaft coaxially joining said motor with said wheel for transmitting rotation to said wheel, said drive shaft extending from said motor through said tubular wheel shaft and being drivingly coupled with said tubular shaft on the wheel side remote from said motor, said drive shaft having lateral clearance in said tubular shaft and being elastically flexible in the lateral direction so as to form an elastic restraint for the gyro, a torsionally stiff coupling which drivingly couples said wheel shaft with said drive shaft, said drive shaft and said tubular shaft at said coupling being axially displaceable relative to each other.

6. A rate gyro comprising a gyro wheel having a gimbal-mounted tubular wheel shaft, a drive motor separate from said wheel and mounted in coaxially spaced relation thereto, a torsionally stiff drive shaft coaxially joining said motor with said wheel for transmitting rotation to said wheel, said drive shaft extending from said motor through said tubular wheel shaft and being drivingly coupled with said tubular shaft on the wheel side remote from said motor, said drive shaft having lateral clearance in said tubular shaft and being elastically flexible in the lateral direction so as to form an elastic restraint for the gyro, a torsionally stiff coupling which drivingly couples said wheel shaft with said drive shaft, said coupling having longitudinally extending teeth on each of said two shafts, the teeth of one shaft being in meshing engagement with those of the other shaft to permit axial displacement of said shafts relative to each other.

7. A rate gyro comprising a gyro wheel having a gimbal-mounted tubular wheel shaft, a drive motor separate from said wheel and mounted in coaxially spaced relation thereto, a torsionally stiff drive shaft coaxially joining said motor with said wheel for transmitting rotation to said wheel, said drive shaft extending from said motor through said tubular wheel shaft and being drivingly coupled with said tubular shaft on the wheel side remote from said motor, said drive shaft having lateral clearance in said tubular shaft and being elastically flexible in the lateral direction so as to form an elastic restraint for the gyro, a torsionally stiff coupling which drivingly couples said wheel shaft with said drive shaft, said coupling having torsionally stiff but axially deflectable diaphragm means interconnecting said two shafts.

8. A rate gyro, comprising a rigid mounting structure, a housing journalled on said structure and angularly deflectable about a transverse axis relative to said structure, a gyro wheel journalled in said housing and having an axis of rotation intersecting said transverse axis at a right angle, a drive motor mounted on said structure spaced from said housing and in coaxial relation to said wheel, a torsionally stiff drive shaft coaxially joining said motor with said wheel for transmitting rotation to said wheel, said shaft being elastically yieldable transversely and forming thereby an elastic restraint of said gyro housing, and energy dissipating means connected with said housing for damping the housing deflection about said restraint-subjected transverse axis.

9. A rate gyro according to claim 8, comprising an iron core mounted on said structure and having an electric coil for providing an electric control magnitude, and a magnet armature attached to said housing to move together therewith, said armature being located near said core for varying said control magnitude in dependence upon deflection of said housing about said transverse axis.

References Cited in the file of this patent
UNITED STATES PATENTS

| | | |
|---|---|---|
| 1,495,769 | Brewerton | May 27, 1924 |
| 2,138,531 | Wise et al. | Nov. 29, 1938 |
| 2,452,335 | Stoner | Oct. 26, 1948 |
| 2,641,134 | Kenyon | June 9, 1953 |
| 2,718,788 | Johnson | Sept. 27, 1955 |
| 2,829,521 | Kuipers | Apr. 8, 1958 |
| 2,852,943 | Sedgfield | Sept. 23, 1958 |

FOREIGN PATENTS

| | | |
|---|---|---|
| 509,447 | France | Aug. 18, 1920 |